Oct. 8, 1946.　　　　A. CROT　　　　2,408,916
BIT SHARPENER
Filed Oct. 6, 1944　　　2 Sheets-Sheet 1
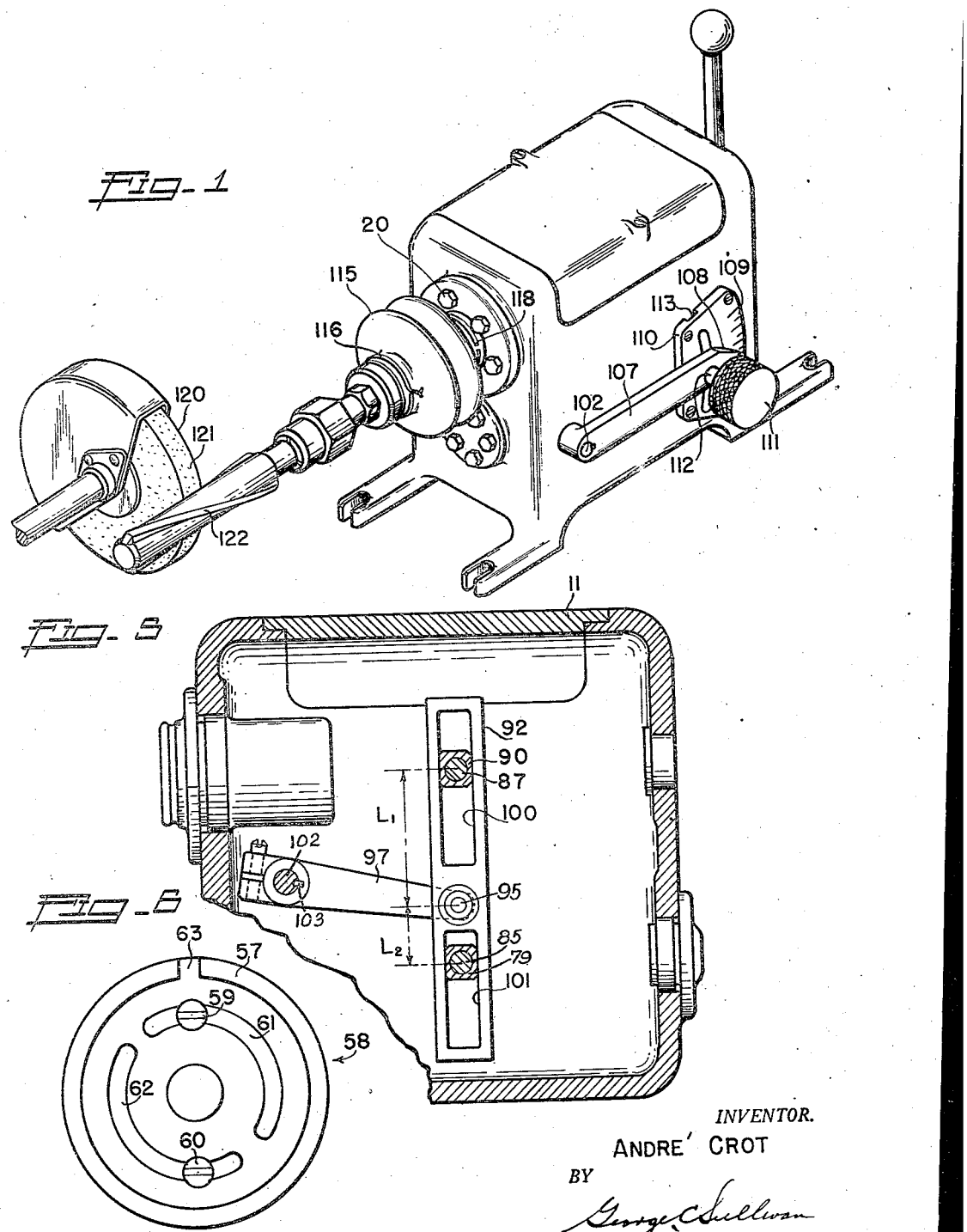
INVENTOR.
ANDRÉ CROT
BY
George C Sullivan
AGENT

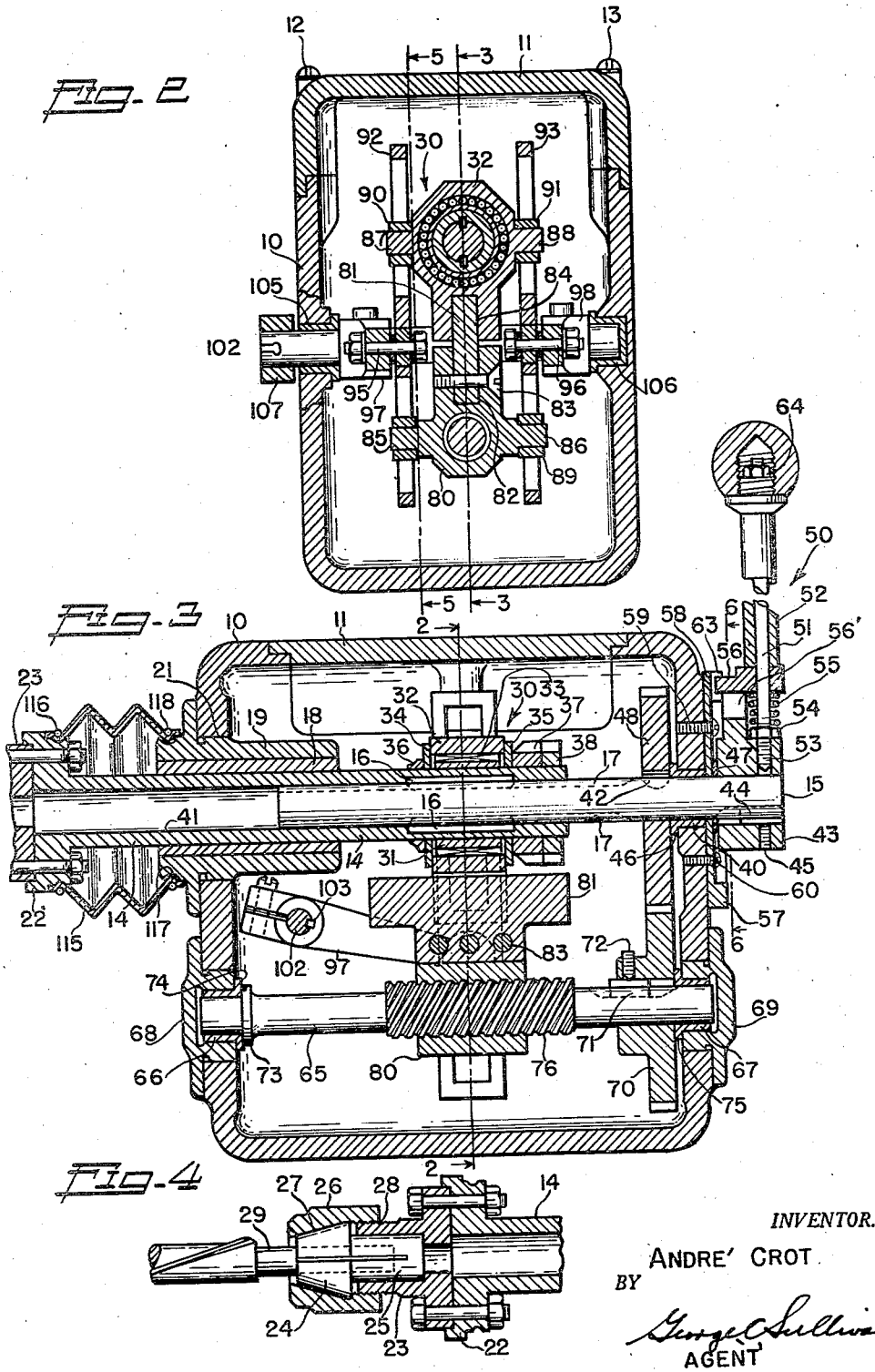

Patented Oct. 8, 1946

2,408,916

UNITED STATES PATENT OFFICE 2,408,916

BIT SHARPENER

André Crot, North Hollywood, Calif., assignor to Lockheed Aircraft Corporation, Burbank, Calif.

Application October 6, 1944, Serial No. 557,412

4 Claims. (Cl. 51—232)

This invention relates to special machine tools for machining helical surfaces of any desired pitch and relates more particularly to and finds its most frequent application to the forming and sharpening of spiral or helical cutting edges of tools such as drills, router bits, milling cutters, and reamers.

Heretofore a manual manipulation of the tool with respect to a grinding stone has been usually employed for the purpose of resurfacing or sharpening spiral or helical cutting edges of drills, router bits, milling cutters, reamers, and the like tools, with the result that such operations were slow and inefficient and resulted in inaccurately shaped, poorly operating tools.

It is an object of this invention to overcome the disadvantages of the manual method and other methods heretofore employed for reconditioning and machining spiral or helical edged tools by providing an automatic machine for this purpose which will be accurate, efficient and fast in operation.

The objects of this invention are attained in general by a machine capable of imparting, between limits, any desired one of an infinitely variable combination of simultaneous rotation and reciprocation motions to a work piece such as a drill, router bit, or reamer, whereby a cutting or grinding operation may be performed on such workpiece along any corresponding helical edge or path having any desired pitch.

These and other objects and features of novelty will be evident hereinafter in the description which, together with the following drawings, illustrate preferred embodiments of the invention.

Figure 1 is a perspective view of the general arrangement of the apparatus of the invention in operative position.

Figure 2 is an end cross-sectional view taken on line 2—2 of Figure 3.

Figure 3 is a cross-sectional side elevation of the machine taken on line 3—3 of Figure 2.

Figure 4 is a cross-sectional detail of the chucking unit carried by the apparatus of Figure 3.

Figure 5 is a cross-sectional view taken on line 5—5 of Figure 2.

Figure 6 is a detail view of the stop plate taken on line 6—6 of Figure 3.

Referring now to the drawings in which like reference characters refer to corresponding parts throughout the several figures, the apparatus of the invention is as follows:

A housing 10 is provided for enclosing the major elements of the machine, said housing having a removable top 11 normally held in place by means of a pair of machine screws 12 and 13.

Extending lengthwise through the upper portion of the housing is a composite shaft comprising tubular spindle 14 and a coaxially positioned spindle drive shaft 15, said tubular spindle and spindle drive shaft being constructed to snugly telescope to provide for limited axial reciprocation with respect to one another and common rotation together. Common rotation of the spindle drive shaft 15 and the tubular spindle 14 is effected by means of a pair of keys 16 retained in suitable recesses on the inside surface of the tubular spindle and adapted to slide axially within a pair of elongated key-ways 17 formed in the surface of the drive shaft 15.

The tubular spindle 14 is reciprocatably and rotatably supported in a bushing 18 which is in turn retained within a bearing support or bearing holder 19 which is inserted and suitably bolted in place, as shown at 20 in an opening 21 located through the wall of the forward end of the housing 10.

As best shown in Figures 3 and 4 the tubular spindle is provided with a flange 22 on its outer end to which may be bolted a chuck body as shown at 23. Any suitable chucking means may be employed depending upon the type of workpiece or tool to be machined but for convenience of illustration herein a split collet type of chuck is shown and described. A split collet grip-assembly providing a plurality of radially positioned jaws is retained as a unit within the collet body by means of an inwardly projected unitary shank 25. A nut 26 having an inner tapered face is shown at 27 and serves upon tightening upon threads 28 of the chuck body to wedge the collet jaws 24 into gripping position upon the cylindrical shank 29 of the tool to be machined.

The inner end of the tubular spindle 14 within the housing 10 carries a thrust bearing 30 which comprises an inner cylindrical race 31 and outer cylindrical race 32 and intermediate needle bearings as shown at 33. At either end of the inner and outer races 31 and 32 thrust washers as shown at 34 and 35 are provided which abut at one end against a collar 36 formed integral with the spindle and at the other end against an adjustable stop nut 37 which is in turn carried on the inner threaded end of the tubular spindle. A lock nut 38 is provided for retaining the thrust nut 37 in adjustment.

The spindle drive shaft 15 which telescopes into the bore of the spindle 14 is rotatably supported in a bushing 40 which is retained in a suitable opening in the end of the housing 10 in coaxial alignment with respect to the beforementioned bearing holder 19 and bushing 18. As hereinbefore stated the drive shaft 15 is of such a size as to make a snug sliding fit within the bore 41 of the tubular spindle 14, whereby said tubular spindle may be reciprocated with respect to said drive shaft through bushing 18. A spur gear 48 is keyed at 42 to the drive shaft 15 adjacent the inner surface of the rear end of the housing. A hub member 43 is keyed at 44 and retained in adjusted axial position on the outer exposed end of the drive shaft 15 by means of a set screw 45. The inner flared end 46 of the bushing 40 acting against the hub of the gear 48 and the washer 47 acting intermediate the housing and the adjacent surface of the hub 43 serves to restrain the spindle drive shaft against axial movement with respect to the housing.

An operating lever or handle 50 extends radially from the hub 43, said handle comprising an inner shaft 51 and an outer axially movable tubular slide 52. The inner handle shaft 51 is fixed in radially extending position with respect to the hub 43 by means of threads and lock-nut as shown at 53 and 54 respectively.

The tubular handle slide 52 is slidable or reciprocatable upon the handle shaft 51 within the limits set by the stop nut 64 against the force of the helical spring 55. The helical spring 55 acting under compression normally retains the tubular handle shaft in a maximum outward position against the stop nut 64 on the end of the handle shaft whereby an offset latch member 56 carried at the lower end thereof and movable radially in a slot 56' in the hub 43 will normally be retained in locked position within a radial locking groove 63 which is formed in the rim 57 of a circular stop plate 58 which is in turn adjustably supported from the outer face of the rear end of the housing by means of a pair of suitable machine screws as shown at 59 and 60. A pair of semi-circular slots 61 and 62 as best shown in Figure 6 provide for angular adjustment of the stop plate for suitable angular positioning of the lock groove 63 as desired.

Enclosed within the lower portion of the housing 10 is a lead screw shaft 65 rotatably supported with its axis parallel with the axes of the before described tubular spindle and drive shaft, in bushings 66 and 67 which are in turn retained in the walls of the housing by means of the bearing holders 68 and 69. A spur gear 70 meshing with the beforementioned drive shaft spur gear 48 is keyed to the lead screw shaft as shown at 71 and adjustable to a limited degree axially thereon by means of a set screw 72. A collar or abutment 73 is formed integrally with the lead screw shaft and axial motion or play of the lead screw and the lead screw shaft 65 is limited by the abutment of the said collar 73 against the inner flared end 74 of the forward bushing 66 and the contact of the hub of the spur gear 70 with the inner surface of the inner flared end 75 of the rear bushing 67.

The lead screw shaft 65 carries at an intermediate section and formed integral therewith a ground and polished lead screw having a plurality of threads of suitable pitch as shown at 76. A nut 80 having internal threads is threaded on the lead screw 76 and is adapted to axial movement upon rotation of the lead screw shaft 65 as hereinafter more fully described. As an example, a ⅞—6, 60° stub tooth lead screw having a major diameter of approximately .875 inch, a minor diameter of .724 inch, a pitch diameter of approximately .80 inch, and a lead of $\frac{5}{16}$ inch was satisfactorily employed in a machine of the type illustrated. The mating nut 80 is provided with an upwardly extending elongated guide tongue 81. The guide tongue 81 is solidly fixed within a slot 82 formed in the upper side of the said nut 80 and is held therein by means of three countersunk machine screws as shown at 83. The upper, elongated portion of the guide tongue enters and makes an axially sliding fit within a corresponding slot as shown at 84 formed in the lower surface of the housing or outer race 32 of the needle thrust bearing 30. The nut 80 and the needle bearing housing 32 are thus secured against rotation.

The lead screw nut 80 is provided with a pair of coaxial oppositely extending trunnions as best shown at 85 and 86 in Figure 2 and the needle thrust bearing housing 32 is similarly provided with a pair of coaxial oppositely extending trunnions as shown at 87 and 88. The trunnions 85 and 86 of the lead screw nut are each pivotally carried in square cross-head members 79 and 89 and the trunnions 87 and 88 of the needle thrust bearing housing 32 are similarly pivotally carried in square cross-head members 90 and 91.

A pair of oppositely positioned walking beam members 92 and 93 are pivotally supported at a point intermediate their ends by means of a pair of pins or bolts as shown at 95 and 96 which are in turn carried in the inwardly extending ends of a pair of adjustable supporting arms 97 and 98. Each of the walking beams is provided with a pair of elongated slots or slides as best shown at 100 and 101 in Figure 5. The inner longitudinal surfaces of the slots 100 and 101 serve as guides in which during the operation cross-head members 90—91 and 79—89 slide.

The arms 97 and 98 are movably supported upon a cross-shaft 102 to which they are keyed as shown at 103. The cross-shaft 102 is pivotally supported in a pair of oppositely positioned bushings 105 and 106 located within the side walls of the housing. The cross-shaft 102 is adapted to be adjustably rotated by means of a lever 107 which carries at its outer end a pointer 108 adapted to move over a graduated scale 109 carried on a scale plate 110. The adjustment lever 107 is adapted to be firmly retained in a given adjusted position with respect to the scale 109 by means of a knurled nob 111 the shaft of which extends through the outer end portion of the lever as shown at 112, and makes threaded connection with a threaded nut which moves in an arc in an internal arcuate recess 113 formed on the inside face of the scale plate 110.

Angular displacement of the adjustment lever 107 serves to move the adjustment arm 97 through a corresponding angle which in turn, acting through the pins or bolts 95 and 96, serves to shift the walking beam 92 longitudinally with respect to the cross-heads 79—89, 90—91.

A flexible leather boot 115 fixed to the spindle flange 22 by means of a clamping wire 116 and retained in rotatable fit in an annular groove 117 in the outer end of the bearing holder 19 by means of a snap ring 118 serves to prevent foreign matter from entering the bearing surfaces between the spindle shaft 14 and the bushing 18 which at the same time provides for rotational and reciprocative freedom of the spindle shaft with respect to the apparatus housing 10.

The operation of the apparatus is as follows:

The drill reamer, router-bit, or the like tool which it is desired to sharpen, is inserted into the collet chuck as best shown in Figures 1 and 4. The rotating cutting wheel 120 powered by suitable means such as an electric motor, not shown, is adjusted into position where, for example as illustrated in Figure 1, a router bit is to be sharpened, the cutting edge 121 will make proper contact at the proper angle with the cutter blade 122. The lever 107 is then adjusted to raise or lower the position of the walking beams 92 and 93 so as to vary the length of the lever arms $L_1$ and $L_2$ formed by the said walking beams 92 and 93 between the pivotal center of the walking beam and the centers of the cross-supports 95 and 96 and the centers of the cross-heads 90—91 at the spindle thrust bearing and heads 79 and 89 at the lead screw nut so that the cutter will, in effect, follow exactly the spiral or helix described by the cutter blade 122. The ratio of the axial motion of the tubular spindle with respect to the axial movement of the lead screw nut will always be proportional to the ratio of the length of the lever arm $L_1$ to the length of the lever arm $L_2$. Axial motion of the spindle 14 and the chuck carried thereon is thus effected by means of the opposite axial motion of the lead screw nut 80, acting through the two oppositely positioned walking beams 92 and 93. Adjustment of the height or vertical position of the walking beam by angular adjustment of the arm 97 is thus obviously effective to vary the ratio of the motion of the spindle with respect to the motion of the lead screw nut between certain limits determined by the dimensions of the elements of the machine, particularly the walking beams 92 and 93.

Upon rotation of the spindle drive shaft 15 by means of the handle 52, the lead screw shaft 65 will also be rotated in an opposite direction through the action of the mutually meshing spur gears 48 and 70. Accordingly, if the handle 52 is rotated clockwise, the drive shaft 15 will likewise be rotated clockwise and the lead screw shaft 65 will be simultaneously rotated counterclockwise at a speed which is proportional to the ratio of the number of teeth on the spur gear 48 to the number of teeth on the spur gear 70. Rotation thus imparted to the lead screw shaft 65 and the lead screw 76 formed thereon will simultaneously result in axial motion of the lead screw nut 80 to the left as viewed in Figure 3. The motion thus imparted from the nut 80 to the crossheads 79 and 89 contained within the lower slot 101 of the walking beams 92 and 93 will result in counter-clockwise angular displacement of the said walking beams about the centers of their supporting pins 95 and 96 with resultant axial motion of the cross-heads 90 and 91 to the right, as viewed in Figures 3 and 5. Corresponding axial displacement of the spindle thrust bearing to the left will result in an outward extension of the tubular spindle shaft 14. The spindle shaft will thus have imparted to it a simultaneous clockwise rotation and axial translation, the relationship of one to the other of which will depend upon the beforementioned gear ratios between the gears 41 and 70 and the ratios of the lever arms $L_1$ and $L_2$. By computation or by experiment, proper adjustment of the adjustment arm 97 and the corresponding position of the lever 107 may be determined for any given relationship between the angular rotation of the spindle shaft and its simultaneous axial motion. Thus any desired motion of the tool to be machined corresponding to any desired pitch or spiral can be obtained. When such relationship has been computed or otherwise determined, the plate 110 may be calibrated by the placing thereon of a corresponding scale as shown at 109, whereby pre-adjustments of the machine may be readily made by simply setting the pointer 108 upon the proper marking of the dial 109.

As hereinbeforementioned, the lever arm 50 is normally locked in fixed position against rotation by means of the latch tongue 56 extending into the locking groove 63 formed radially in the circular rim 57 of the stop plate. Upon depressing the handle slide 52 radially inward against the force of the spring 55, the latch tongue 56 is carried inwardly out of engagement with the groove 63, thus freeing the handle for rotation of the spindle drive shaft 15. In operations where a larger number of the same kind of tool is to be machined or ground, it may be desirable to adjust the angular position of the stop plate by means of the screws 59 and 60 to provide for identical and suitable initial settings of the machine in accordance with the working requirements.

While a grinding wheel, for purposes of illustration, has been shown at 120 in Figure 1, other types of cutting tools may obviously be employed to perform similar operations.

While a preferred embodiment of the invention has been illustrated and described hereinbefore, the invention is not to be limited thereby, but is intended to cover any variation or modification which falls within the scope of the claims.

I claim:

1. Apparatus for machining a helical surface comprising chucking means for a workpiece to be machined, a coaxial shaft rotatably and axially reciprocatably supporting said chucking means, a lead screw positioned parallel to and adjacent said shaft, drive means coupling said lead screw and said shaft together for simultaneous rotation at a fixed ratio, a nut on said screw axially movable in response to rotation of said lead screw, a thrust bearing associated with and adapted to move said chucking means axially, a walking beam pivotally coupled adjacent one end to said nut and adjacent the opposite end to said thrust bearing, means to support pivotally said walking beam for angular displacement in response to axial motion of said nut whereby said thrust bearing and said nut are thus coupled together through said walking beam for simultaneous axial motions.

2. Apparatus for machining a helical surface comprising chucking means for a workpiece to be machined, a coaxial shaft rotatably and axially reciprocatably supporting said chucking means, a lead screw positioned parallel to and adjacent said shaft, drive means coupling said lead screw and said shaft together for simultaneous rotation at a fixed ratio, a nut on said screw axially movable in response to rotation of said lead screw, a thrust bearing associated with and adapted to move said chucking means axially, a walking beam pivotally coupled at one point thereon to said nut and at another point thereon to said thrust bearing, means to support pivotally said walking beam for angular displacement in response to axial motion of said nut whereby said thrust bearing and said nut are thus coupled together through said walking beam for simultaneous axial displacement.

3. Apparatus in accordance with claim 1 in which said pivotal walking beam support is adjustable in position with respect to said pivotal coupling to said nut and said thrust bearing.

4. Apparatus according to claim 2 in which said pivotal walking beam support is adjustable in position with respect to said pivotal coupling to said nut and said thrust bearing.

ANDRÉ CROT.